(12) United States Patent
An et al.

(10) Patent No.: US 12,189,433 B2
(45) Date of Patent: Jan. 7, 2025

(54) REMOTE WIRELESS PRINTER SYSTEM

(71) Applicant: Copart, Inc., Dallas, TX (US)

(72) Inventors: William An, Waxahachie, TX (US);
Casey Sudduth, Addison, TX (US);
Dustin Parkinson, McKinney, TX (US); Merrylle Martinez, Frisco, TX (US); Victor Tang, Flower Mound, TX (US)

(73) Assignee: Copart, Inc., Dallas, TX (US)

( * ) Notice: Subject to any disclaimer, the term of this patent is extended or adjusted under 35 U.S.C. 154(b) by 275 days.

(21) Appl. No.: 17/968,213

(22) Filed: Oct. 18, 2022

(65) Prior Publication Data
US 2024/0126339 A1 Apr. 18, 2024

(51) Int. Cl.
| | | |
|---|---|---|
| H04N 1/04 | (2006.01) | |
| G06F 1/16 | (2006.01) | |
| G06F 3/12 | (2006.01) | |
| H02J 7/00 | (2006.01) | |
| H02J 7/35 | (2006.01) | |
| H04L 9/40 | (2022.01) | |

(52) U.S. Cl.
CPC .......... *G06F 1/1656* (2013.01); *G06F 3/1203* (2013.01); *G06F 3/1236* (2013.01); *G06F 3/1292* (2013.01); *H02J 7/0047* (2013.01); *H02J 7/35* (2013.01); *H04L 63/029* (2013.01)

(58) Field of Classification Search
None
See application file for complete search history.

(56) References Cited

U.S. PATENT DOCUMENTS

| | | | |
|---|---|---|---|
| 8,885,196 B2 * | 11/2014 | Tsuji ................... | G06F 3/1253 358/1.14 |
| 2017/0243091 A1 * | 8/2017 | Yamada ............. | G06K 15/1802 |
| 2020/0307255 A1 * | 10/2020 | Takai ................... | G06F 1/1694 |

* cited by examiner

*Primary Examiner* — Cheukfan Lee

(57) ABSTRACT

A self-contained printing system includes a weatherproof housing defining an interior for containing the self-contained printing system components. A printer located within the weatherproof housing prints documents responsive to a print command. The printer is powered by a battery located within the weatherproof housing. A charging system charges the battery located within the weatherproof housing responsive a charging signal. At least one solar panel located on an exterior of the weatherproof housing provides the charging signal. Wireless communications circuitry enables the receipt of the print commands from an external device located outside of the weatherproof housing via a wireless communications link and communications with at least one remote server via the wireless communications link. A system processor monitors wireless communications link and generates status messages responsive thereto. At least one display located on the exterior of the weatherproof housing displays the status messages.

20 Claims, 11 Drawing Sheets

REMOTE WIRELESS PRINTER SYSTEM

TECHNICAL FIELD

The present invention relates to printing systems, and more particularly to self-contained printing systems deployable in a remote environment.

BACKGROUND

In certain situations, such as a natural disaster, there is the need to deploy remote printing systems that enable the printing of large volumes of printed material with respect to paperwork associated with, for example, insurance claims for vehicles and buildings in the adversely affected areas. Currently, standard printers and printing systems have been used to connect to portable devices, mobile devices and computers in order to print out this type of printed material in, for example, a command or operations center. However, standard printers and printing systems are configured to operate in a home and office environment and can experience various types of problems when deployed to a field environment that may have more adverse environmental conditions. Thus, there is a need for a portable, deployable printing system that may be set up in any location that may not currently have a working infrastructure to support operations of the printing system.

SUMMARY

The present invention, as disclosed and described herein, in one aspect thereof, comprises a self-contained printing system includes a weatherproof housing defining an interior for containing the self-contained printing system components. A printer located within the weatherproof housing prints documents responsive to a print command. The printer is powered by a battery located within the weatherproof housing. A charging system charges the battery located within the weatherproof housing responsive a charging signal. At least one solar panel located on an exterior of the weatherproof housing provides the charging signal. Wireless communications circuitry enables the receipt of the print commands from an external device located outside of the weatherproof housing via a wireless communications link and communications with at least one remote server via the wireless communications link. A system processor monitors wireless communications link and generates status messages responsive thereto. At least one display located on the exterior of the weatherproof housing displays the status messages.

BRIEF DESCRIPTION OF THE DRAWINGS

For a more complete understanding, reference is now made to the following description taken in conjunction with the accompanying Drawings in which.

DETAILED DESCRIPTION

Figure 1:
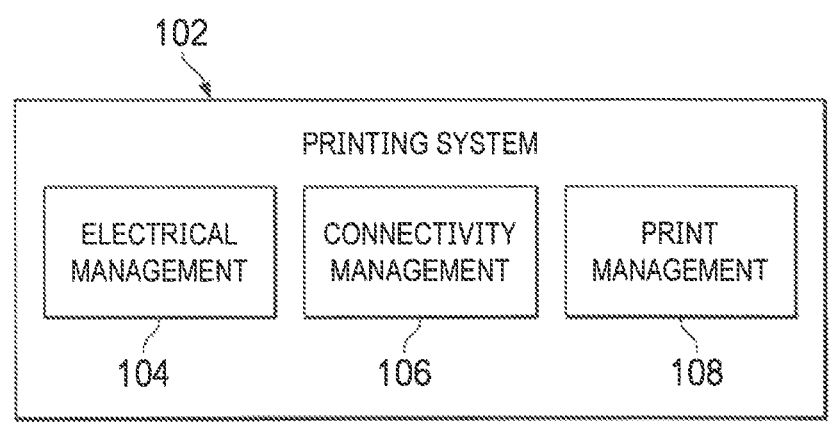
FIG. 1 illustrates a functional block diagram of a remotely deployable wireless printing system.

Referring now to the drawings, wherein like reference numbers are used herein to designate like elements throughout, the various views and embodiments of a remote wireless printer system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a functional block diagram of a deployable remote wireless printer system 102. The remote wireless printer system 102 provides for the deployment of network printing services to any non-infrastructure supported location. The network printing services enable the printing of various types of documents, such as stickers and labels, at any location and in any environment. The remote wireless printer system 102 comprises a self-contained unit including a number of different circuitries. These circuitries include electrical management circuitry 104, connectivity management circuitry 106 and print management circuitry 108.

Electrical management circuitry 104 comprises electrical input, storage and management systems for charging and powering the remote wireless printing system 102. The circuitries can include solar power circuitry, AC circuitry, DC circuitry, a LiFePO4 battery, wireless charging circuitry, and a customized Linux based operating system. The connectivity management circuitry 106 provides for Internet access, virtual private network connectivity and connection management to devices communicating with the remote wireless printer system 102. The connectivity management circuitry 106 enables connectivity to both private and public 4G networks. The connectivity management circuitry 106 also enables Wi-Fi connections to the remote wireless printer system 102 and provides for device security when communicating over the various network connections. The connectivity management circuitry 106 also provides data connection monitoring software for monitoring the data connections to monitor for connection and security issues. The print management circuitry 108 enables document printing and print management elements such as providing print application servers, principal (printer) spoolers and the actual printing devices.

Figure 2:
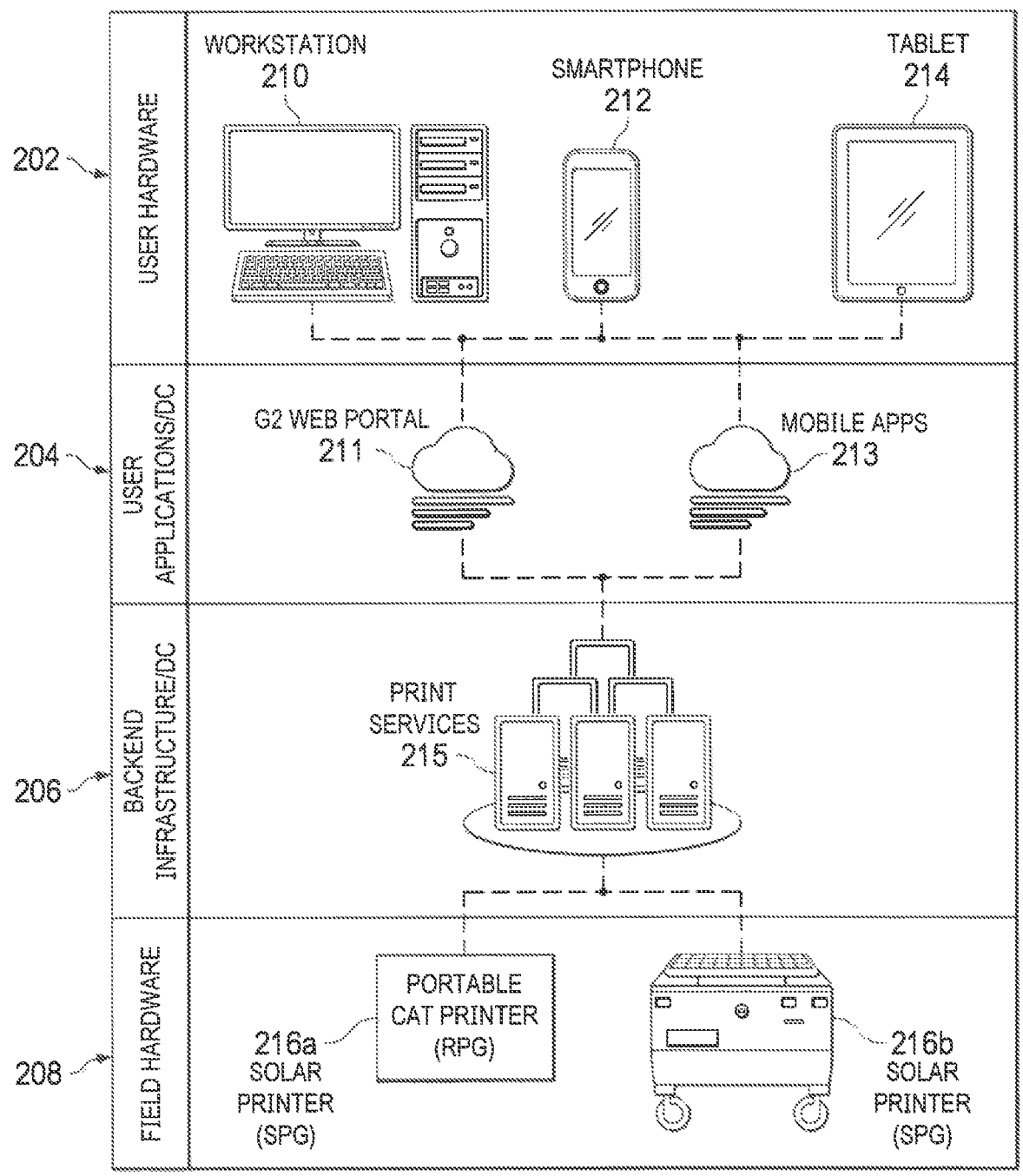
FIG. 2 illustrates the various components of the remotely deployable wireless printing system.

Referring now to FIG. 2, there are illustrated the main components of the printing system 102. These components comprise various levels of hardware and systems that enable remote printing system deployment. These components consist of user hardware 202, user applications 204, backend infrastructure 206 and field hardware 208. The user devices 202 comprise various components which may transmit printing instructions to a printer device and include things such as workstations 210, smart phones 212 and tablets 214. The user hardware 202 comprise end-user facing devices from which a request to print is initiated. The user applications 204 comprise various applications that are implemented upon the user devices 202 that enable the initiation of print commands to a printing system 102. The user applications 204 comprise software and web applications from which the user devices 202 can send a request to a provider's web portal 211 and mobile applications 213. The backend infrastructure 206 queue and drives print jobs through printers that are within the field hardware 208 using various print queues services 215. The print services 215 comprise things such as print service and management and print servers. The field hardware 208 consists of portable printers 216. Remote printers 216a and solar printers 216b, as will be more fully described herein below, provide various printing solutions and further include monitoring software for reporting the printer 216 environmentals, electrical and data connection information.

Figure 3:
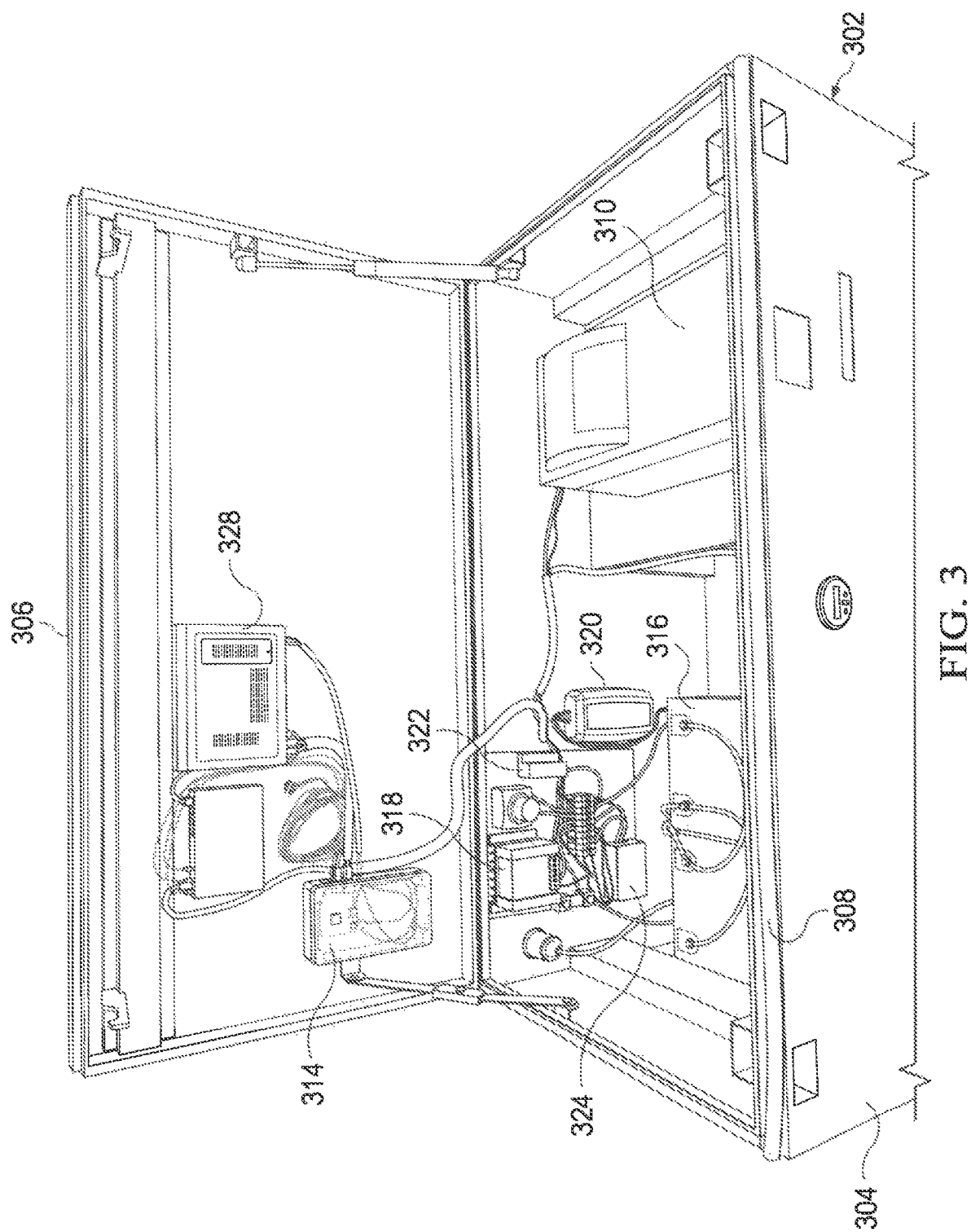
FIG. 3 illustrates various components of the wireless printing system within a weatherproof enclosure.

Referring now to FIG. 3, there is illustrated a deployable wireless printing system 102 according to the present disclosure. The printing system 102 is included within a weatherproof housing 302 consisting of a container 304 having an open side with a lid 306 which may be moved from an open position to a close position to cover the open side and environmentally seal the components of the system within the housing 302. A weather seal 308 is around a top edge of the container 304 and interfaces with an edge of the lid 306. When the lid 306 is closed, the weather seal 308 provides an environmental seal between the lid 306 and the container 304 to prevent environmental elements from accessing components within the housing 302. The housing 302 enables a networked printing system to be placed outdoors without any external power source or direct physical connection. The housing 302 encloses the system components within a portable weatherproof enclosure that protects the system components from natural elements.

The printing system components contained within the weatherproof housing 302 include a printer 310. The printer 310 prints out any documents responsive to instructions received therefrom over a wireless connection from external user hardware devices. The system provides a wireless connection to the various user hardware 202 located outside the housing. The system can use various types of wireless communications protocols. A firewall 328 provides for the protection of the printer system components that are communicating with external components and acts as a switch. A breadboard 314 controls the system clock rate and data rate over an internal bus using resistors thereon. A pair of batteries 316 store the power provided to the batteries by either solar panels or a charging connection to a vehicle or other external power source. A charge controller 318 controls the charging operations of the batteries 316 responsive to a charge current received from connected solar panels or other charging circuitry. A charging unit 320 generates a charging current to the batteries responsive to the charge current provided by the solar panels or other external charging source. A firewall 328 enables Wi-Fi and/or LTE communications with all of the external user devices, the printer 310 and various system components. A DC-to-DC converter 324 provides power to the printer 310 from the batteries 316. A fuse block 322 provides current limiting protection to all 12-volt devices.

Figure 4:
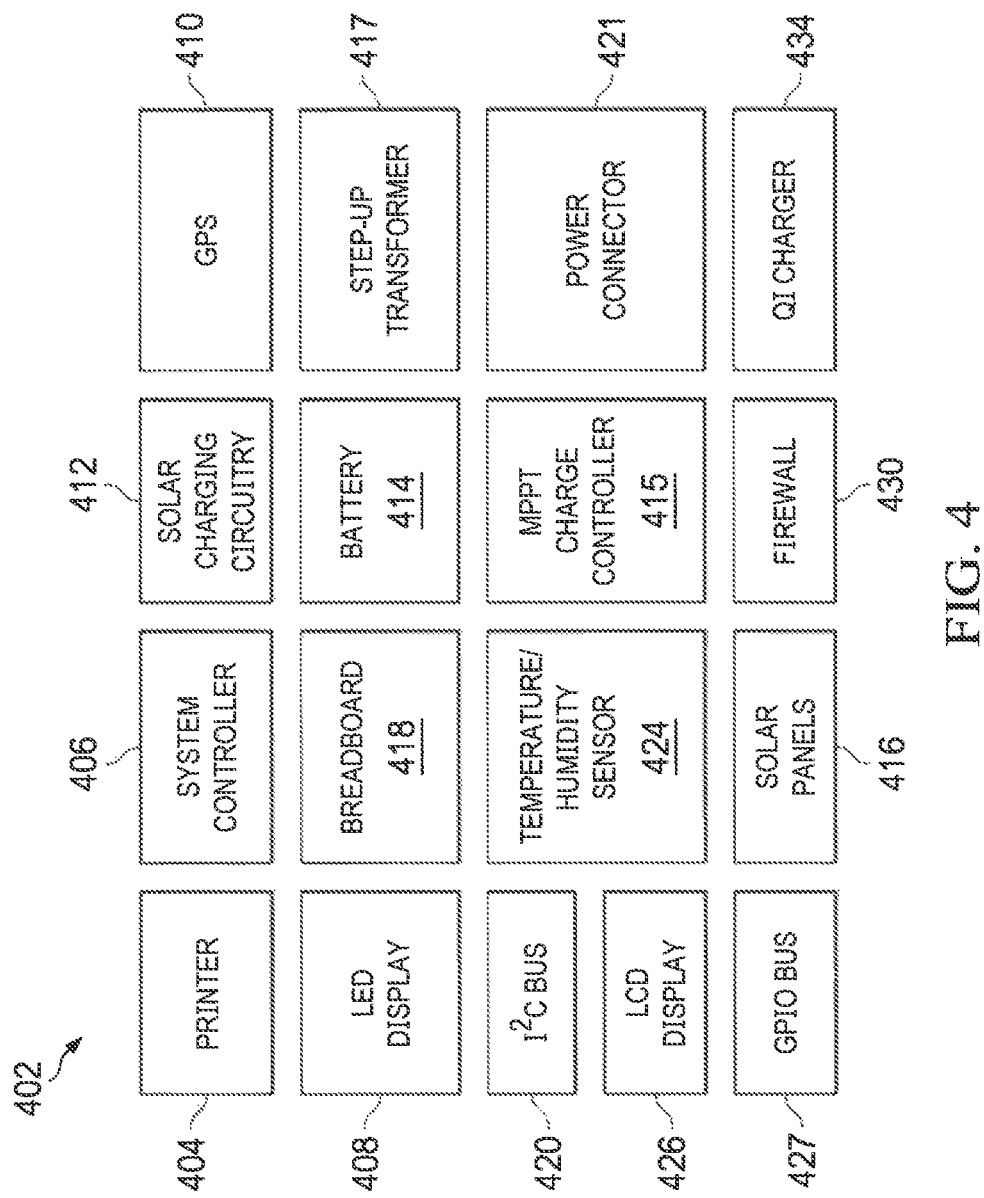
FIG. 4 illustrates a block diagram of a solar powered remote printing system.

Referring now to FIG. 4 there is illustrated a functional block diagram of a solar powered printing system 402. A printer 404 powered by solar panels may print any documents, labels, stickers or other items responsive to signals received from user devices in wireless communication with the solar powered printing system 402. A system controller 406 provides reporting from the various components within the printing system 402. The system controller 406 may comprise any type of processing device but in a preferred embodiment comprises a Raspberry Pi processor. The system controller 406 remotely monitors power metrics, device health, and print server connectivity status. The system controller 406 uses a custom script to include a temperature/humidity sensor 424 and an LCD display 426 that give status conditions regarding connectivity, pertinent IP information and temperature/humidity conditions within the housing container. The system controller 406 includes a custom embedded script that pings connected data centers to verify print server connectivity with a device. A GPS 410 may also be included to track the movements and current location of the printing system 402 or its connected devices. The connectivity status can be displayed by an RGB LED 408 located on the exterior surface of the housing 302. Data connection, environmental readings and status indications are visually presented to a user via a light emitting diode indicator display 408. Reference number 434 depicts a QI charger which provides QI wireless charging for mobile devices.

The LED color codes provided by the LED displays 408 are used in the following manner to provide indication of the status of the various connections. A red LED indicator provides notice that the data centers and the Internet are both unreachable. A green LED indicator indicates that all data centers may be reached, and that the Internet is reachable. A pink LED indicator indicates that a first data center is reachable, but a second data center is not reachable. Further the Internet is reachable. A yellow LED indicator indicates that the first data center is unreachable, and the second data center is reachable as is the Internet. Finally, the blue LED indicator indicates that that none of the data centers are reachable but the Internet is reachable. Various colors associated with the status condition of the connections to the data centers and the Internet are merely one example thereof. Various color codes may be associated with the above conditions in any fashion to provide the information on the exterior LED displays of the housing 302.

Solar charging circuitry 412 provides means for providing a charging current to a battery 414. The solar charging circuitry 412 receives a charging current from the solar panels 416 on the surface of the housing 302. The solar charging circuitry 412 charges the battery 414 responsive to the charging current from the solar panels 416 through a MPPT charge controller 419. The battery 414 may also be charged or the system powered by a charge connector 421 that provides AC or DC power to the system. A breadboard 418 mounted on top of the system controller 406 includes two 2.2 K Ohm resistors to drag down the clock signal (SCL) and data signal (SDA) bus with seven bit addressing so that the multiple I2C devices can communicate on the same I2C bus transmission lines 420. The temperature/humidity sensors 424 pass data through the systems GPIO (Gen. input/output) 40 pin bus 427. Data connection, environmental readings, and status indications are visually presented to a user via an LCD display 426. In order for these components to provide input and receive output from the system controller 406 resistance is added to the individual channels via the 2.2 K ohm resistor on the breadboard 418.

The wireless communications enable the printing of items via the printer 404. The communications between the printing system 402 and the external devices are protected via a firewall 430 providing standard communication protocol protections. The firewall 430 also provides for transmission and reception of instructions to the printing system.

Figure 5:
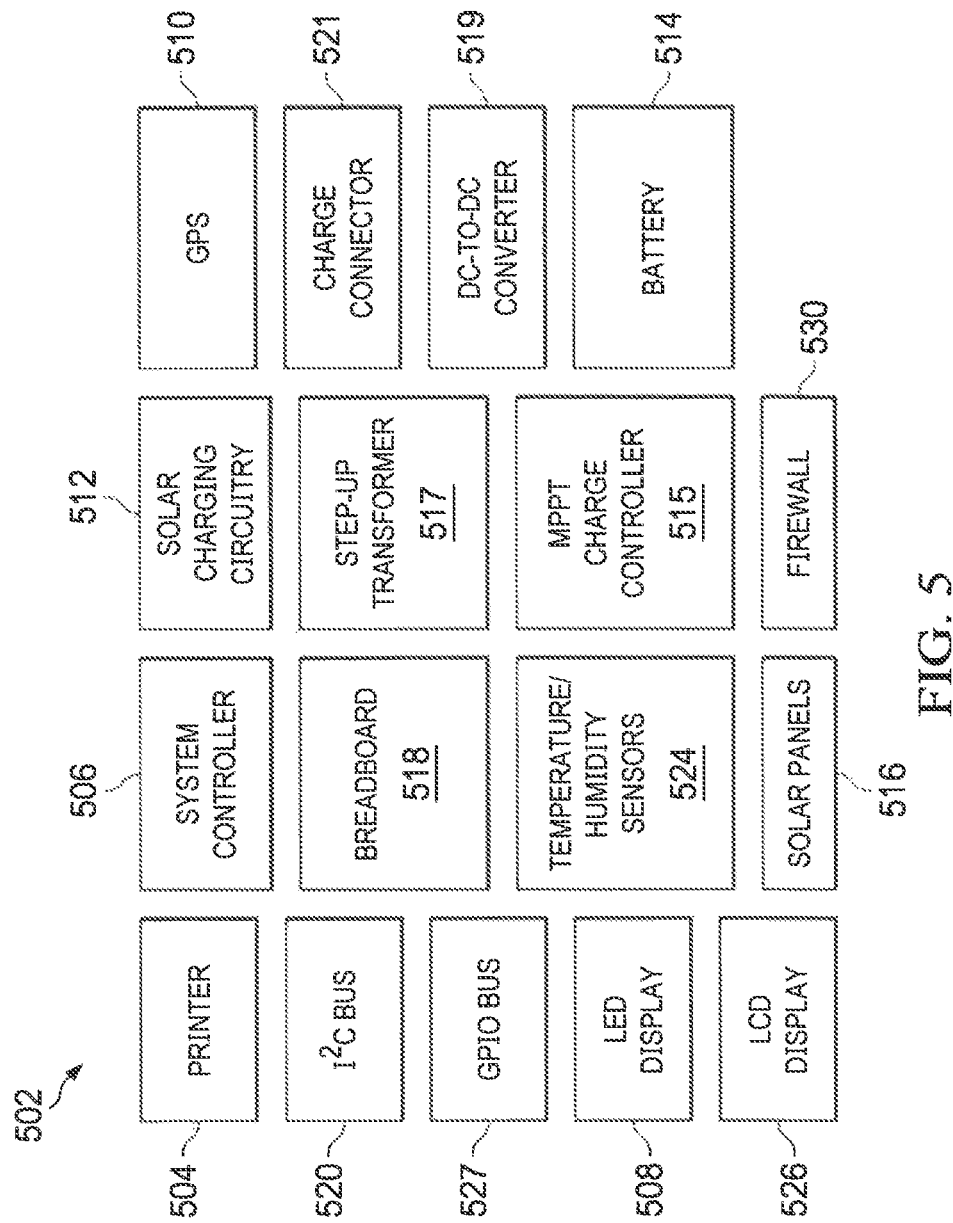
FIG. 5 illustrates a block diagram of a solar powered/external connection powered remote printing system.

Referring now to FIG. 5 there is illustrated a functional block diagram of a remote powered printing system 502. A printer 504 powered by solar panels may print any documents, labels, stickers or other items responsive to signals received from user devices in wireless communication with the remote powered printing system 502. A system controller 506 provides processing of the various components within the printing system 502. The system controller 506 may comprise any type of processing device but in a preferred embodiment comprises a Raspberry Pi processor. The system controller 506 remotely monitors power metrics, device health and print server connectivity status. The system controller 506 uses a custom script to include a temperature/humidity sensor 524 and an LCD display 526 that give status conditions regarding connectivity, pertinent IP information and temperature/humidity conditions within the weatherproof housing container. The system controller 506 includes a custom embedded script that pings connected data centers to verify print server connectivity with a device. A GPS 510 may also be included to track the movements and current location of the printing system 502 or its connected devices. The connectivity status can be displayed by an RGB LED 508 located on the exterior surface of the housing 302. Data connection, environmental readings and status indications are visually presented to a user via a light emitting diode indicator display 508 and an LED display 508.

The LED color codes provided by the LED displays 508 are used in the following manner to provide indication of the status of the various connections. A red LED indicator provides notice that the data centers and the Internet are both unreachable. A green LED indicator indicates that all data centers may be reached, and that the Internet is reachable. A pink LED indicator indicates that a first data center is reachable, but a second data center is not reachable. Further the Internet is reachable. A yellow LED indicator indicates that the first data center is unreachable, and the second data center is reachable as is the Internet. Finally, the blue LED indicator indicates that that none of the data centers are reachable, but the Internet is reachable. Various colors associated with the status condition of the connections to the data centers and the Internet are merely one example thereof. Various color codes may be associated with the above conditions in any fashion to provide the information on the exterior LED displays of the housing 302.

The embodiment of FIG. 5 normally does not include solar panels 516 and associated solar charging circuitry 512. This embodiment of FIG. 5 includes the solar charging circuitry and everything needed for a solar powered operation, except for the solar panel itself. All that is needed for it to be operational is a solar panel plugged into the connection on the back of the device. However, wiring for these components are provided by the system so that the components can be added to the embodiment of FIG. 5 in an alternative configuration. In this case, solar charging circuitry 512 provides means for providing a charging current to a battery 514. The solar charging circuitry 512 receives a charging current from the solar panels 516 on the surface of the housing 302. The solar charging circuitry 512 charges the battery 514 responsive to the charging current from the solar panels 516 through an MPPT change controller 515. A DC-to-DC converter 519 provides for charging the battery 514 responsive to a charging current provided from a charge connector 521. The charge connector 521 provides a connection to an external connection to a charging source like a vehicle, generator, cigarette port, etc.

A breadboard 518 mounted on top of the system controller 506 includes two 2.2 K Ohm resistors to drag down the clock signal (SCL) and data signal (SDA) bus with seven bit addressing so that the multiple I2C devices can communicate on the same I2C bus transmission lines 520. The temperature/humidity sensors 524 pass data through the systems GPIO (Gen. input/output) 40 pin bus 527. Data connection, environmental readings and status indications are optionally, visually presented to a user via an LCD display 526. In order for these components to provide input and receive output from the system controller 506 resistance is added to the individual channels via the 2.2 K ohm resistor on the breadboard 518.

The wireless communications enable the printing of items via the printer 504. The communications between the printing system 502 and the external devices are protected via a firewall 530 providing standard communication protocol protections. The firewall 530 also provides for transmission and reception of instructions to the printing system.

Figure 6:
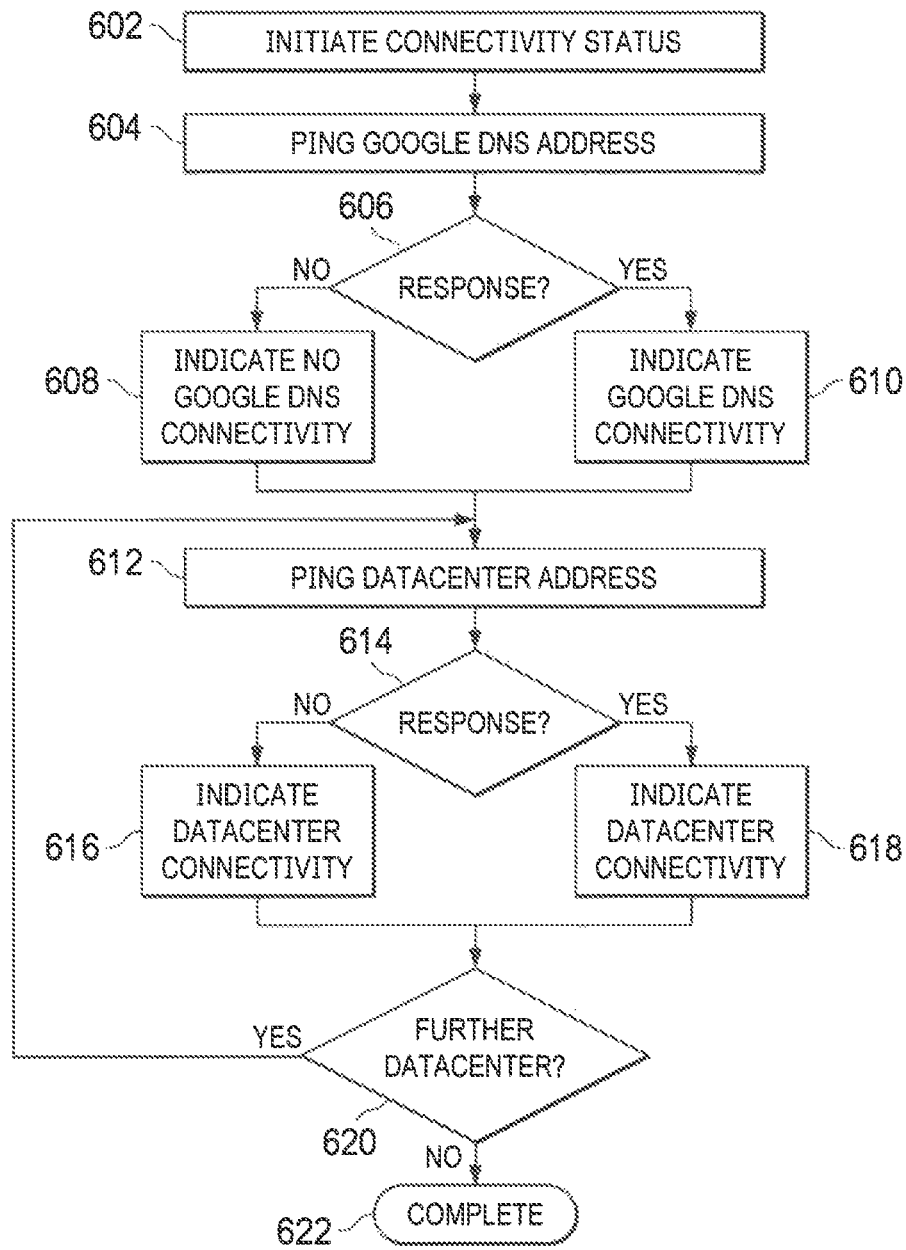
FIG. 6 illustrates a flow diagram of the process for confirming Internet connections to the remote printing system.

Referring now to FIG. 6, there is illustrated a flow diagram of the connectivity status logic within the system controller 406/506 of FIGS. 4 and 5. A connectivity status check is initiated at step 602. Initially, the system controller 406 pings the Google DNS address at 604 to establish connectivity therewith. Inquiry step 606 monitors for a response to the ping from the Google DNS address. If no response is received, an indication of no Google DNS connectivity is provided via the LED lights at step 608 in the manner described herein above. If inquiry step 606 receives a response, an indication of Google DNS connectivity as being available is provided at step 610 via the LED lights. Next, data center connectivity is established at step 612 by pinging a first data center connectivity address. Inquiry step 614 monitors for a response from the pinged data center. If no response to the ping is received, an indication of no data center connectivity is provided at step 616 through the system LEDs. If inquiry step 614 detects a ping response, an indication of data center connectivity is provided at step 618 using the LEDs. Inquiry step 620 determines if there are further data centers to ping and if so, returns to step 612 to ping the next data center. Once inquiry step 620 determines that all data centers have been pinged, the process is completed at step 622 and final system connectivity may be indicated through the LED display.

Figure 7:
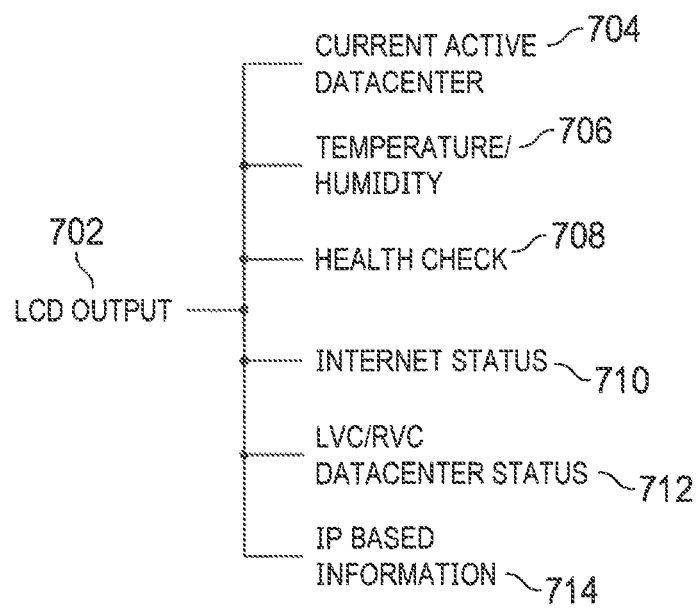
FIG. 7 illustrates the various LCD outputs of the remote printing system.

The system controller 406 in conjunction with the temperature/humidity sensors 424 and the LCD display 426 may provide a variety of types of output to the LCD display 426 on the surface of the weatherproof housing 302. As illustrated in FIG. 7, the LCD output 702 may provide a number of different types of information as more fully described herein below. The information may comprise the current active data center 704, the temperature/humidity 706, a health check 708, Internet status 710, LVC/RNC datacenter status 712 and IP-based information 714. The current active data center 704 merely indicates the data centers associated with the system that are currently active and receiving and transmitting data. The temperature/humidity display provides the current temperature in Fahrenheit or Celsius and the current humidity within the weatherproof housing. This can provide necessary information with respect to the applicable operating environment of the printer system. The health check 708 indicates the status of various system conditions that are checked by the system processor. These checked items include device temperature which is confirmed not to exceed the overheat threshold of 145 degrees Fahrenheit, the humidity of the device internal environment (a high humidity can indicate a leak or compromised weather seal), reachability of network connectivity between the device and predetermined internet locations based upon a success or failure to connect and network latency (the roundtrip time for communications between the device and the 'print servers' over the VPN (virtual private network) to occur). If each of the conditions fall within desired parameters a green health condition can be provided, and if any fall outside of the desired parameters a red, pink, yellow, or blue condition will be indicated.

The Internet status 710 provides an indication of whether an Internet connection is currently available to the printing system 302. The LVC/RNC data center status 712 indicates the connection status associated with two data centers associated with the printing system. As discussed previously, any number of data centers may communicate with the system, and the system is not limited to two. The IP-based information 714 provides an IP address associated with the printing center, and various addresses that are being contacted by the printing system.

Figure 8:
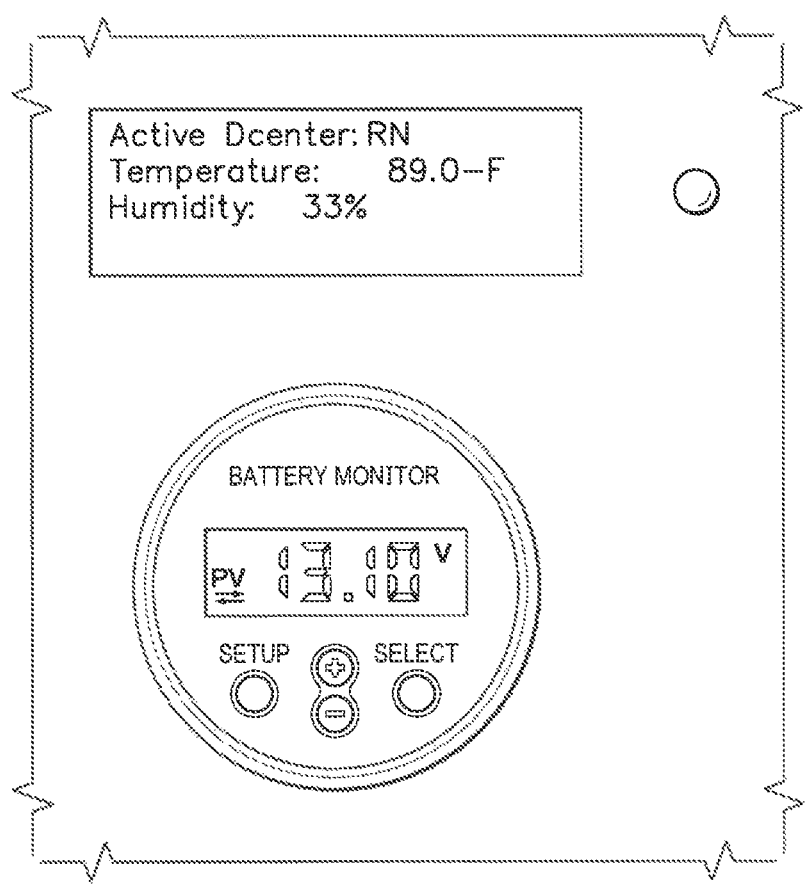
FIG. 8 illustrates a first configuration of the LCD display and battery monitor of the remote printing system.
Figure 9:
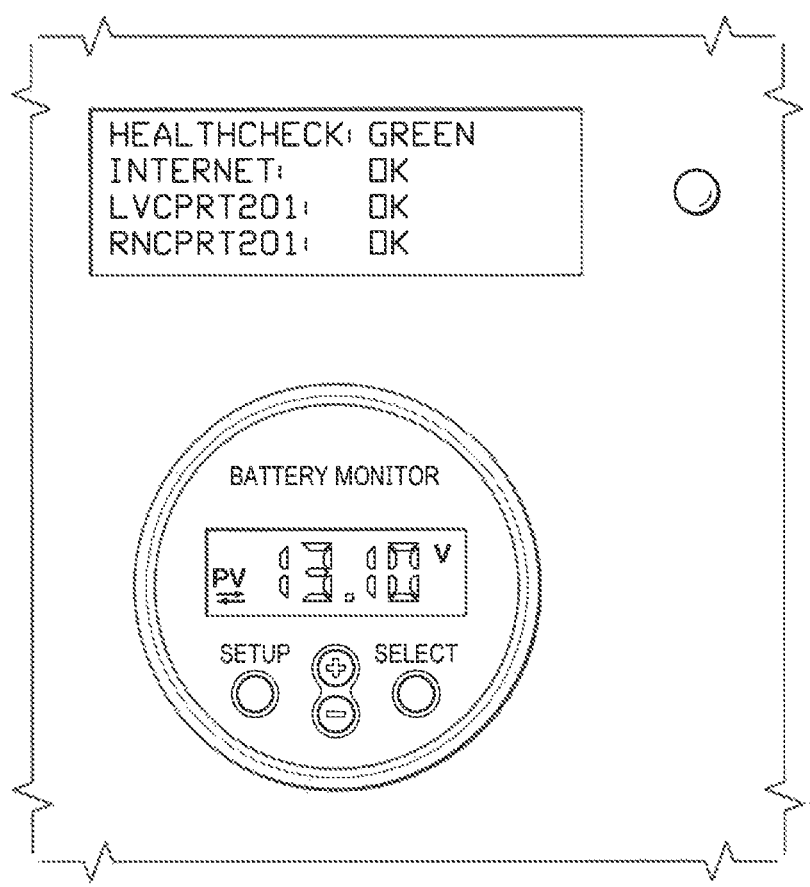
FIG. 9 illustrates a second configuration of the LCD display and battery monitor of the remote printing system.
Figure 10:
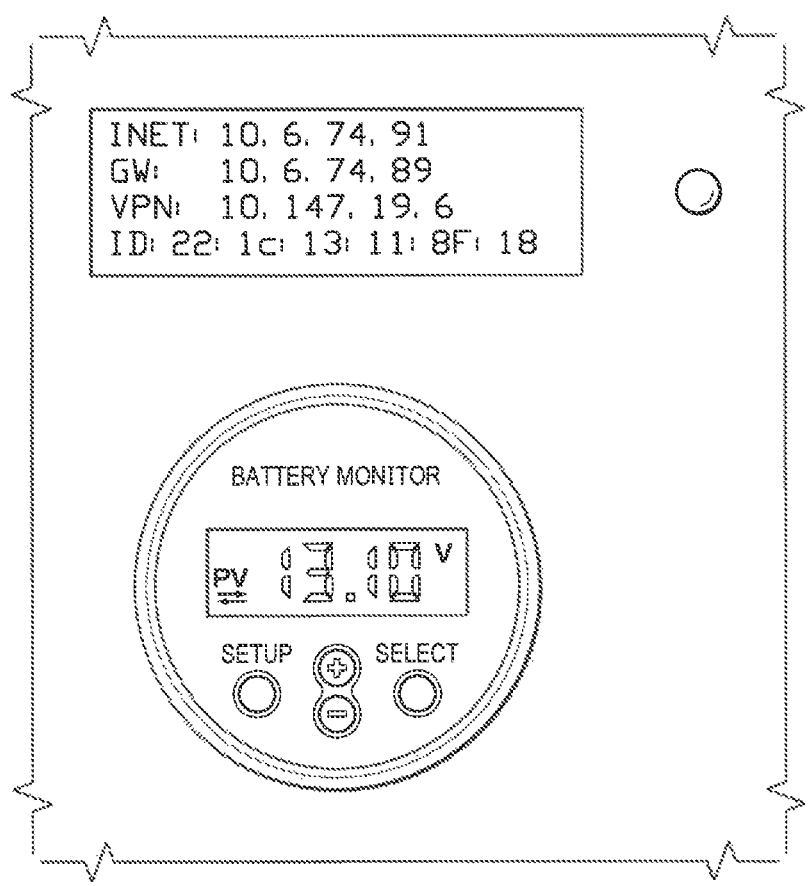
FIG. 10 illustrates a third configuration of the LCD display and battery monitor of the remote printing system.

Referring to FIGS. 8-10, there are illustrated the various examples of the LCD display output 702 displaying the type of information discussed with respect to FIG. 7. Within each of FIGS. 8-10, the LCD display 802 is provided above the battery monitor display 804 which indicates the amount of charge in the system batteries and other electrical information. In FIG. 8, the LCD display 802 is providing an indication of an active data center "RN" that is currently available to the system. The display additionally illustrates that the current temperature is 89° F. and the humidity is 33% within the weatherproof housing. FIG. 9 illustrates an LCD display 802 illustrating that the health check for the system is "green" indicating that the system is operating in a desired fashion. Further, the status of the Internet and two different data centers (LVCPRT201, RNCPRT201) is indicated as being "OK." Finally, FIG. 10 illustrates that the LCD display 802 indicates various IP addresses associated with INET, a gateway (GW) and a virtual private network (VPN). The display 802 also indicates the ID for the deployed printing system.

Figure 11:
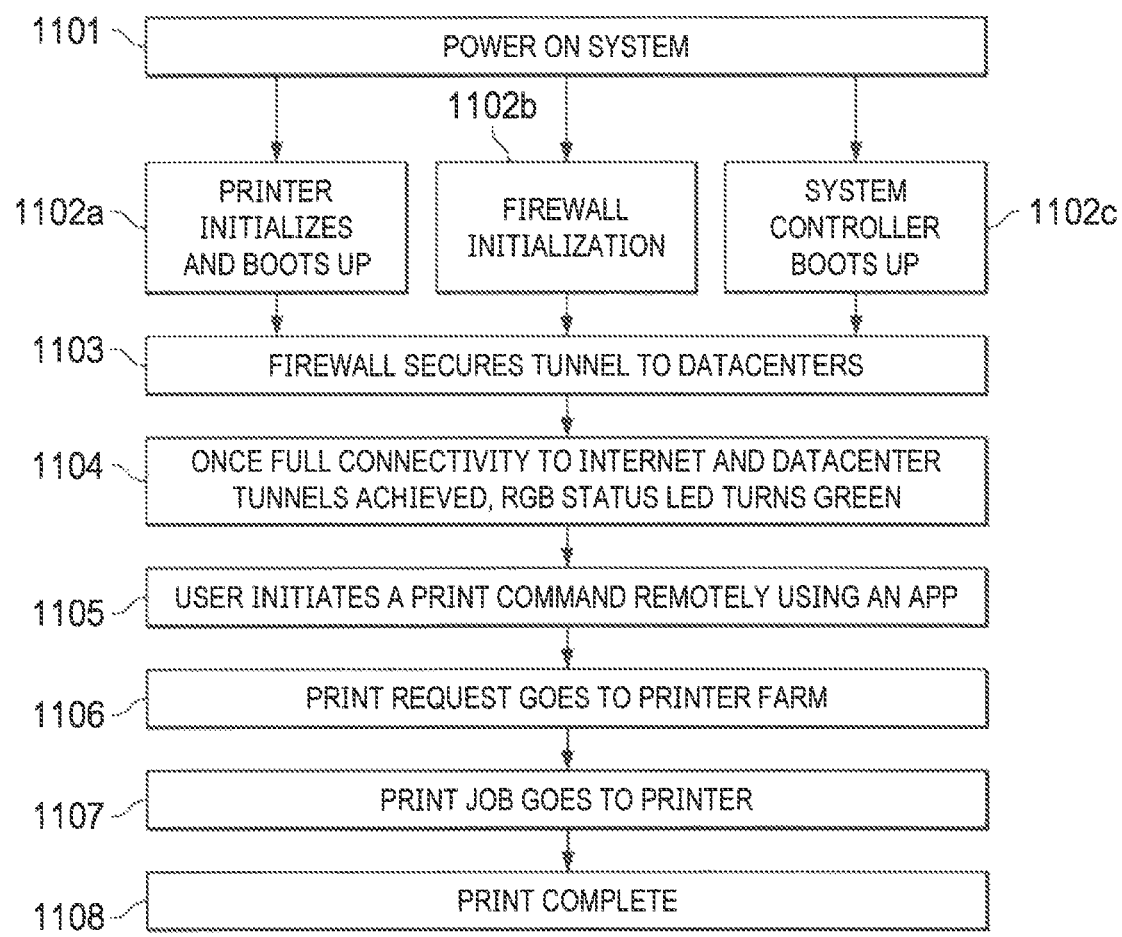
FIG. 11 illustrates a flow diagram of the receipt and execution of a print command and the start-up process of the system controller according to an embodiment of the disclosed remote printing system.

Referring now to FIG. 11, there is illustrated a flow diagram of the receipt and execution of a print command and the start-up process when the system controller 406/506 of FIGS. 4 and 5 is first turned on when placed in the field. Initially, at step 1101 the system controller 406 is powered on. Once the system controller 406 is powered on, the firewall 430 begins to obtain an LTE connection at 1102*b* while the system controller 406 and printer 404 simultaneously boot up at 1102*a* and 1102*c*, respectively. Next the firewall secures LTE connectivity with the Internet and datacenter tunnels as shown in step 1103. When full connectivity to the Internet and datacenter tunnels is achieved, the RGB status LED 408 turns solid green as in 1104. At this point, the system is ready to receive a print command. A user of the system initiates a print command remotely at step 1105. The user can initiate the print job by scanning or capturing a yard specific QR code located onsite using a scanning device utilizing the Ops Mobile App or Transportation App (a mobile device application). Once the QR code is scanned and the request received, the system sends the print job to the print servers print farm at step 1106. Next, data is then sent from the print server to the printer at step 1107 to print the label. Finally, the label is printed at step 1108.

It will be appreciated by those skilled in the art having the benefit of this disclosure that this remote wireless printer system provides an improved manner for pointing remote printing personalities in an environment that does not provide a network infrastructure. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A self-contained printing system, comprising:
 a weatherproof housing defining an interior for containing self-contained printing system components;
 a printer located within the weatherproof housing for printing documents responsive to print commands, the printer powered by a battery located within the weatherproof housing;
 a charging system for charging the battery located within the weatherproof housing responsive a charging signal;
 wireless communications circuitry for enabling receipt of the print commands from an external device located outside of the weatherproof housing via a wireless communications link and communications with at least one remote server via the wireless communications link;
 a system processor for monitoring wireless communications link and generating status messages responsive thereto; and
 at least one display located on an exterior of the weatherproof housing for displaying the status messages.

2. The printing system of claim 1 further comprising at least one solar panel located on the exterior of the weatherproof housing for providing the charging signal.

3. The printing system of claim 1, wherein the weatherproof housing further comprises:
 a container defining a space therein and having one open side for providing access to the interior of the weatherproof housing;
 a lid for enclosing the open side of the container that moves between an open position and a closed position; and
 a seal located at an interface of the container and the lid to provide a seal from an external environment when the lid is in the closed position.

4. The printing system of claim 1, wherein the wireless communications circuitry further comprises a firewall device comprising:
 a wireless communications interface for transmitting and receiving over the wireless communications link;
 a wireless hub for providing communications with the self-contained printing system through the wireless communications interface; and
 a firewall for protecting the communications through the wireless hub.

5. The printing system of claim 1, wherein the at least one display comprises:

an LED display for displaying a current status of connections to the at least one remote server; and
an LCD display for displaying the status messages provided by the system processor.

6. The printing system of claim 1 further comprising:
a charge connector located on the exterior of the weatherproof housing for connecting to an external charging source to provide the charging signal; and
a power converter for charging the battery responsive to a signal from the external charging source.

7. The printing system of claim 1 further comprising a temperature/humidity sensor for detection of a temperature and humidity within the weatherproof housing to enable generation of the status messages with respect to the temperature and the humidity.

8. The printing system of claim 1 further comprising:
an I2C bus for providing communication of signals between the components of the self-contained printing system;
a breadboard; and
at least one resistor on the breadboard, wherein a configuration of the at least one resistor on the breadboard set a clock rate and a data rate for the I2C bus.

9. The printing system of claim 1, wherein the system processor periodically pings the at least one remote server and monitors for a response therefrom to confirm a connection with the at least one remote server.

10. A self-contained printing system, comprising:
a housing defining an interior space therein for containing self-contained printing system components and having one open side for providing access to the interior space;
a lid for enclosing the open side of the housing that moves between an open position and a closed position;
a seal located at an interface of the housing and the lid to provide a seal from an external environment when the lid is in the closed position;
a printer located within the housing for printing documents responsive to print commands, the printer powered by a battery located within the housing;
a charging system for charging the battery located within the housing responsive a charging signal;
wireless communications circuitry for enabling receipt of the print commands from an external device located outside of the housing via a wireless communications link and communications with at least one remote server via the wireless communications link;
a system processor for monitoring wireless communications link and generating status messages responsive thereto;
a temperature/humidity sensor for detection of a temperature and a humidity within the housing to enable generation of the status messages with respect to the temperature and the humidity; and
at least one display located on an exterior of the housing for displaying the status messages.

11. The printing system of claim 10 further comprising at least one solar panel located on the exterior of the housing for providing the charge signal.

12. The printing system of claim 10, wherein the wireless communications circuitry further comprises a firewall device comprising:
a wireless communications interface for transmitting and receiving over the wireless communications link;
a wireless hub for providing communications with the self-contained printing system through the wireless communications interface; and
a firewall for protecting the communications through the wireless hub.

13. The printing system of claim 10, wherein the at least one display comprises:
an LED display for displaying a current status of connections to the at least one remote server; and
an LCD display for displaying the status messages provided by the system processor.

14. The printing system of claim 10 further comprising:
a charge connector located on the exterior of the housing for connecting to an external charging source to provide the charging signal;
a power converter for charging the battery responsive to a signal from the charging system; and
a second charge connector located on the exterior of the housing for connecting an MPPT to charge via solar to provide the charging signal.

15. The printing system of claim 10 further comprising:
an I2C bus for providing communication of signals between the components of the self-contained printing system;
a breadboard; and
at least one resistor on the breadboard, wherein a configuration of the at least one resistor on the breadboard set a clock rate and a data rate for the I2C bus.

16. The printing system of claim 10, wherein the system processor periodically pings the at least one remote server and monitors for a response therefrom to confirm a connection with the at least one remote server.

17. A self-contained printing system, comprising:
a weatherproof housing defining an interior for containing self-contained printing system components;
a printer located within the weatherproof housing for printing documents responsive to print commands, the printer powered by a battery located within the weatherproof housing;
a charging system for charging the battery located within the weatherproof housing responsive a charging signal;
at least one solar panel located on an exterior of the weatherproof housing for providing the charging signal;
a charge connector located on the exterior of the weatherproof housing for connecting to an external charging source;
wireless communications circuitry for enabling receipt of the print commands from an external device located outside of the weatherproof housing via a wireless communications link and communications with at least one remote server via the wireless communications link;
a system processor for monitoring wireless communications link and generating status messages responsive thereto, wherein the system processor periodically pings the at least one remote server and monitors for a response therefrom to confirm a connection with the at least one remote server; and
an LED display located on the exterior of the weatherproof housing for displaying a current status of connections to the at least one remote server responsive to the pings of the system processor; and
an LCD display for displaying the status messages provided by the system processor.

18. The printing system of claim 17, wherein the weatherproof housing further comprises:
a container defining a space therein and having one open side for providing access to the interior of the weatherproof housing;

a lid for enclosing the open side of the container that moves between an open position and a closed position; and a seal located at an interface of the container and the lid to provide a seal from an external environment when the lid is in the closed position.

19. The printing system of claim 17, wherein the wireless communications circuitry further comprises a firewall device comprising:

a wireless communications interface for transmitting and receiving over the wireless communications link;

a wireless hub for providing communications with the self-contained printing system through the wireless communications interface; and a firewall for protecting the communications through the wireless hub.

20. The printing system of claim 17 further comprising:

a power converter for charging the battery responsive to a signal from the external charging source.

* * * * *